UNITED STATES PATENT OFFICE.

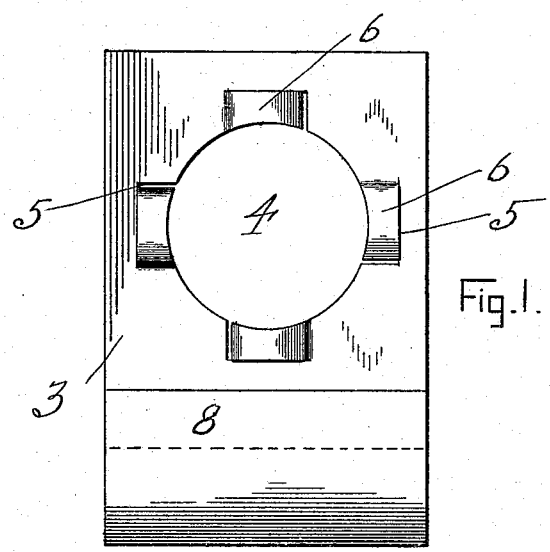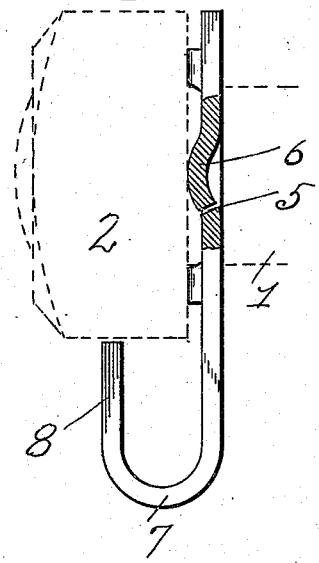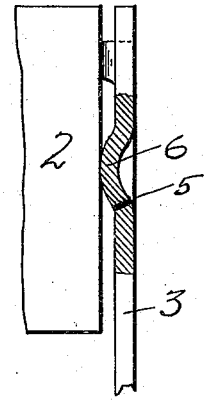

WILLIAM M. SMITH, OF TURTLE CREEK, PENNSYLVANIA.

NUT-LOCK.

No. 930,808.  Specification of Letters Patent.  Patented Aug. 10, 1909.

Application filed February 20, 1909. Serial No. 479,165.

*To all whom it may concern:*

Be it known that I, WILLIAM M. SMITH, a citizen of the United States, residing at Turtle Creek, in the county of Allegheny and State of Pennsylvania, have invented certain new and useful Improvements in Nut-Locks, of which the following is a specification.

This invention relates to nut locks particularly adapted for use in connection with rail joints, and although the nut lock is designed primarily for use in connection with rail joints, yet it is to be understood that the nut lock is adapted for any purposes wherein it is found applicable.

The primary object of the invention is to provide a nut lock in a manner as hereinafter set forth with means constituting a permanent lock to prevent turning of the nut and to further provide the lock with means constituting an automatically operable ledge for preventing looseness of the joint or the nut due to contraction or wear of the parts or elements with which the lock is employed.

Further objects of the invention are to provide a nut lock which shall be simple in its construction, strong, durable, efficient in its use, readily applied, embodying an automatically operable clamping means, and inexpensive to manufacture.

With the foregoing and other objects in view, the invention consists of the novel construction, combination and arrangement of parts hereinafter more specifically described and illustrated in the accompanying drawing wherein is shown the preferred embodiment of the invention, but it is to be understood that changes, variations and modifications can be resorted to which come within the scope of the claims hereunto appended.

In the drawing wherein like reference characters denote corresponding parts throughout the several views, Figure 1 is an elevation of a locking washer in accordance with this invention. Fig. 2 is a side elevation of a nut lock in accordance with this invention with the form of washer shown in Fig. 1. Fig. 3 is a sectional detail showing one of the protuberances partly depressed.

Referring to Figs. 1 and 2 of the drawing, 1 denotes a bolt, 2 a nut, and 3 a locking washer. The inner face of the nut 2 is flat throughout. The locking washer 3 is formed from a rectangular strip of tempered steel and is of the same width as the width of the nut but of such a length as to project from the nut when the nut and washer are mounted upon the bolt 1. The opening 4 of the washer is positioned at one side of the center thereof and at diametrically opposite points with respect to the edge of the opening 4 the body of the washer is provided with L-shaped or angle-shaped slits 5 and that portion of the body of the washer between each of the slits 5 and the edge of the opening 4 is struck up to provide a series of yieldable protuberances 6 which constitute automatically operable wedges for taking up wear or for insuring a tight joint in case of contractions of the rails or other elements to which the lock is attached. Each of the protuberances in longitudinal section is segment-shaped in contour, certain of the protuberances extend transversely with respect to the washer and the remaining protuberances longitudinally of the washer. The transverse protuberances are arranged in parallelism with respect to each other and a like arrangement is had with respect to the longitudinally extending protuberances. The protuberances are spaced equi-distant apart with respect to each other and are arranged at the inner edge of the washer. The manner in which such function as referred to in connection with the yieldable protuberances 6 is performed will hereinafter be more specifically referred to. The washer 3 is bent upon itself so as to provide a rounded end 7 and a locking wing 8, the latter when the nut 2 is screwed home is positioned approximately centrally of that side of the nut which opposes the locking wing. The locking wing 8 extends in parallelism with respect to the outer face of the body portion of the washer and when the washer is mounted upon the bolt and engages with a nut, the edge of the locking wing of the washer extends in parallelism with respect to one side of the nut.

When setting up a nut lock in accordance with this invention, the bolt is extended through the elements which are desired to be locked, the washer positioned on the bolt and against one of the elements and the nut placed upon the threaded portion of the bolt. The nut is then screwed home, as the nut moves toward the washer it engages the locking wing 8, on a further movement of the nut 2 the locking wing 8 is depressed.

The wing 8 is depressed until the nut clears the same and the wing then springs up. The nut is then screwed home and has its face engaging the yieldable protuberances 6, depressing them. If, for any cause, due by way of example to wear or a sudden jar, the protuberances 6 right themselves and their tendency is to bear against the inner face of the nut, the nut constituting an abutment will cause the washer to move toward the element through which extends the bolt, consequently a clamping action or wedging action is caused by the protuberances thereby insuring a tight joint. In case of contraction of the elements with which the nut lock is used, the yieldable protuberances 6 will act in the manner as just referred to. In case that the nut attempts to turn rearwardly off the bolt, its movement in such direction will be arrested by the locking wing, as is evident, and under such circumstances a positive lock is set up.

What I claim is:

1. In a nut lock, a washer having a portion thereof bent upon itself to constitute a locking wing for engagement with a nut, the edge of said locking wing adapted to extend in parallelism with respect to the side of the nut, said locking wing being yieldable and spaced from the body portion of the washer, said washer furthermore provided with a series of angle-shaped slits arranged equi-distant from each other, that portion of the washer between the slits and the inner edge thereof struck up to provide a series of yieldable protuberances substantially segment-shaped in longitudinal section.

2. A nut lock comprising a rectangular washer having its opening to one side of the center thereof and further having the imperforate portion at one side of the opening bent upon itself to constitute a locking wing for engagement with the nut, said washer furthermore provided with a series of yieldable protuberances substantially segment-shaped in longitudinal section, said protuberances arranged at the edge of the opening in the washer, certain of said protuberances extending transversely with respect to the washer and the remaining longitudinally with respect to the washer, said protuberances constituting automatically operable wedging devices.

3. A nut lock comprising a rectangular washer having its opening to one side of the center thereof and further having the imperforate portion at one side of the opening bent upon itself to constitute a locking wing for engagement with the nut, said washer furthermore provided with a series of yieldable protuberances substantially segment-shaped in longitudinal section, said protuberances arranged at the edge of the opening in the washer, certain of said protuberances extending transversely with respect to the washer and the remaining longitudinally with respect to the washer, said protuberances constituting automatically operable wedging devices, the protuberances extending transversely with respect to the washer arranged in parallelism with respect to each other, and the protuberances extending longitudinally of the washer arranged in parallelism with respect to each other.

4. A nut lock comprising a rectangular washer having its opening to one side of the center thereof and further having the imperforate portion at one side of the opening bent upon itself to constitute a locking wing for engagement with the nut, said washer furthermore provided with a series of yieldable protuberances substantially segment-shaped in longitudinal section, said protuberances arranged at the edge of the opening in the washer, certain of said protuberances extending transversely with respect to the washer and the remaining longitudinally with respect to the washer, said protuberances constituting automatically operable wedging devices, the protuberances extending transversely with respect to the washer arranged in parallelism with respect to each other, and the protuberances extending longitudinally of the washer arranged in parallelism with respect to each other, said protuberances being spaced equi-distant from each other.

In testimony whereof I affix my signature, in presence of two witnesses.

WILLIAM M. SMITH.

N. LOUIS BOGAN,
R. M. PARKER.